(12) United States Patent
Littlejohn

(10) Patent No.: US 12,382,146 B2
(45) Date of Patent: *Aug. 5, 2025

(54) MULTI-STATE WATERMARK DETECTOR

(71) Applicant: iHeartMedia Management Services, Inc., San Antonio, TX (US)

(72) Inventor: Jeffrey Lee Littlejohn, Cincinnati, OH (US)

(73) Assignee: iHeart Media Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,084

(22) Filed: Apr. 11, 2023

(65) Prior Publication Data

US 2023/0247269 A1  Aug. 3, 2023

Related U.S. Application Data

(63) Continuation of application No. 17/179,482, filed on Feb. 19, 2021, now Pat. No. 11,659,256, which is a
(Continued)

(51) Int. Cl.
H04N 7/10 (2006.01)
H04N 7/025 (2006.01)
(Continued)

(52) U.S. Cl.
CPC ... *H04N 21/8358* (2013.01); *H04N 21/41422* (2013.01); *H04N 21/4334* (2013.01); *H04N 21/4353* (2013.01); *H04N 21/44008* (2013.01); *H04N 21/44016* (2013.01); *H04N 21/458* (2013.01); *H04N 21/4622* (2013.01); *H04N 21/6112* (2013.01); *H04N 21/6131* (2013.01); *H04N 21/812* (2013.01); *H04N 21/858* (2013.01)

(58) Field of Classification Search
CPC ....... H04N 21/23424; H04N 21/44016; H04N 21/812; H04N 21/8358
See application file for complete search history.

(56) References Cited

U.S. PATENT DOCUMENTS

| 6,411,725 | B1 | 6/2002 | Rhoads |
| 6,487,538 | B1 | 11/2002 | Gupta |
| 8,055,540 | B2 | 11/2011 | Pudar |
| 2003/0066089 | A1 | 4/2003 | Andersen |

(Continued)

*Primary Examiner* — Gigi L Dubasky
(74) *Attorney, Agent, or Firm* — Harness, Dickey & Pierce, P.L.C.

(57) ABSTRACT

A radio frequency (RF) receives a media broadcast including media items and embedded watermarks. A watermark detection module included in the RF receiver operates in a low-power state, during which the watermark detection module does not attempt to detect the embedded watermarks. The watermark detection circuitry is activated, thereby transitioning from the low-power state to an active state, in response to receiving an attention marker. during the active state the watermark detection circuitry attempts to detect the embedded watermarks in the media broadcast, and continues to do so until an indication that watermark detection is to be discontinued is received. In response to receiving the indication that the watermark detection is to be discontinued, the watermark detection module is again placed in the low-power state.

20 Claims, 7 Drawing Sheets

Related U.S. Application Data continuation of application No. 15/224,999, filed on Aug. 1, 2016, now Pat. No. 10,932,011.

(51) Int. Cl.

| | | |
|---|---|---|
| *H04N 21/414* | (2011.01) | |
| *H04N 21/433* | (2011.01) | |
| *H04N 21/435* | (2011.01) | |
| *H04N 21/44* | (2011.01) | |
| *H04N 21/458* | (2011.01) | |
| *H04N 21/462* | (2011.01) | |
| *H04N 21/61* | (2011.01) | |
| *H04N 21/81* | (2011.01) | |
| *H04N 21/8358* | (2011.01) | |
| *H04N 21/858* | (2011.01) | |

(56) References Cited

U.S. PATENT DOCUMENTS

| | | | |
|---|---|---|---|
| 2004/0194130 A1 | 9/2004 | Konig | |
| 2009/0073871 A1 | 3/2009 | Ko | |
| 2009/0165067 A1 | 6/2009 | Bruckman | |
| 2010/0269128 A1 | 10/2010 | Gordon | |
| 2013/0111509 A1* | 5/2013 | Guo | H04H 60/45 |
| | | | 725/12 |
| 2013/0177199 A1 | 7/2013 | Subramanian | |
| 2014/0152786 A1 | 6/2014 | Nicholson | |
| 2014/0282695 A1 | 9/2014 | Bakar | |
| 2015/0042571 A1 | 2/2015 | Lambardi | |
| 2016/0148334 A1* | 5/2016 | Petrovic | H04N 21/435 |
| | | | 382/100 |
| 2016/0150297 A1 | 5/2016 | Petrovic | |
| 2016/0182973 A1 | 6/2016 | Winograd | |
| 2016/0353124 A1* | 12/2016 | Gish | G06T 1/0021 |
| 2017/0177449 A1* | 6/2017 | Bronk | H04W 4/70 |

* cited by examiner

MULTI-STATE WATERMARK DETECTOR

CROSS REFERENCE TO RELATED PATENTS

The present U.S. Utility patent application claims priority pursuant to 35 U.S.C. § 120 as a continuation of U.S. Utility application Ser. No. 17/179,482 entitled "MEDIA SUBSTITUTION TASK BASED ON BROADCAST WATERMARK," filed Feb. 19, 2021, pending, which is a continuation of U.S. Utility application Ser. No. 15/224,999 entitled "MEDIA SUBSTITUTION TRIGGERED BY BROADCAST WATERMARK," filed Aug. 1, 2016, now U.S. Pat. No. 10,932,011 on Feb. 23, 2021, which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to detecting watermarks in a media broadcast, and more particularly to a multi-state watermark detector.

2. Description of Related Art

Currently, broadcast media content is transmitted using an over-the-air signal to an automobile or other mobile radio with advertisements embedded in the over-the-air signal. Currently, most automobile or other mobile radios receive FM, AM, or Satellite broadcast signals, with some radios also having the ability to connect to streaming radio via a device such as a smartphone, onboard cellular or Wi-Fi.

Some conventional broadcast systems allow content from multiple broadcast streams to be combined in the radio and presented to a listener. In some such systems, a first broadcast stream includes audio content interspersed with intermittent advertisement slots identified by a marker. A second broadcast stream includes the advertisements to be inserted into the first stream. A radio receives advertisements from the second stream, and stores some of those advertisements locally. When the radio detects a marker identifying the advertisement slot in the first stream, it inserts one of the local advertisements into the marked slot for presentation to a listener.

Such conventional techniques of marking advertising slots for advertisement insertion at the end-user's radio is not necessarily ideal, especially where it may be necessary to conserve power. For example, the need of some conventional systems to constantly attempt detection of markers in a broadcast can consume a large number of processor cycles, and consume power that would not otherwise be required.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

Figure 6:
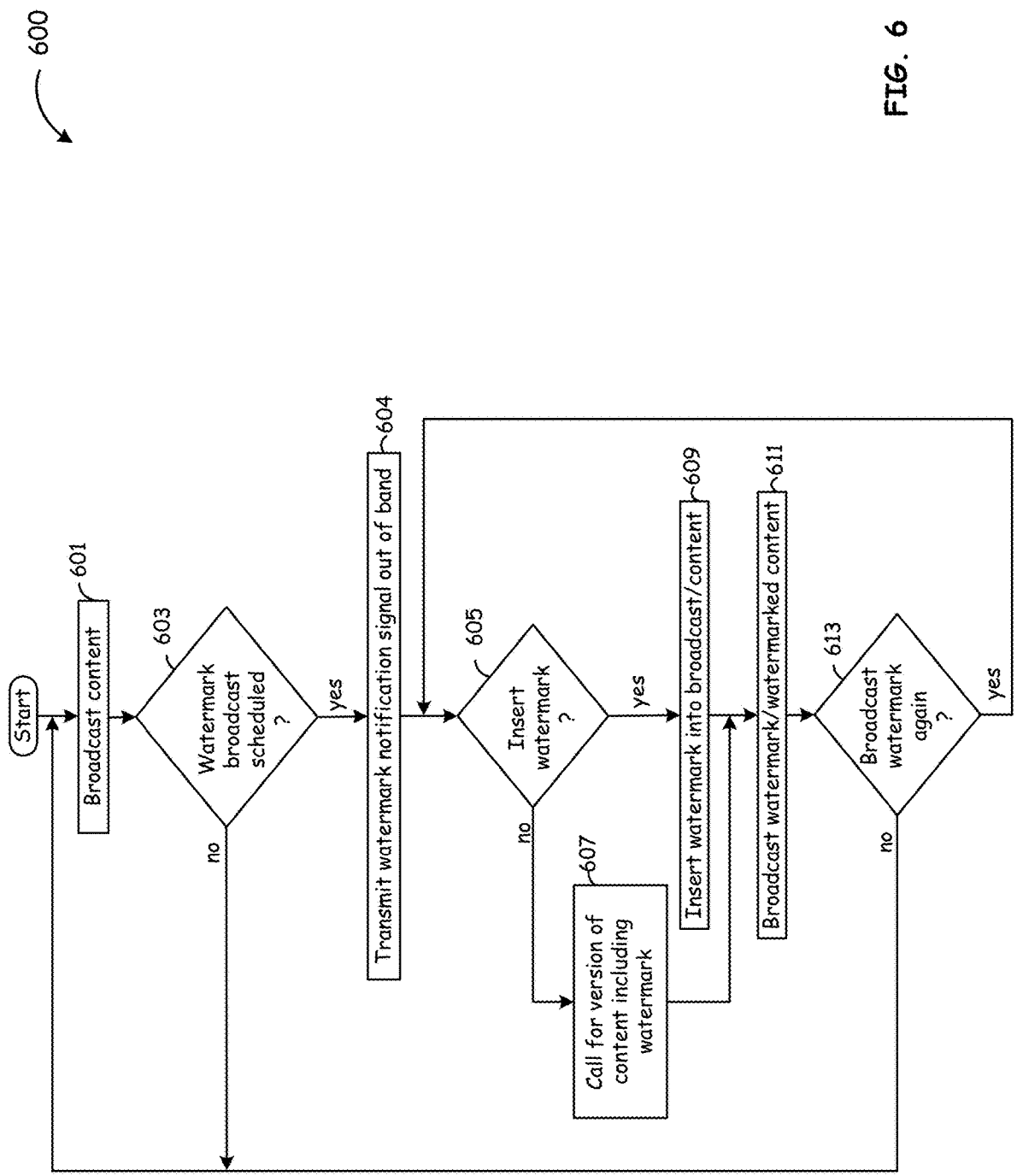
Figure 7:
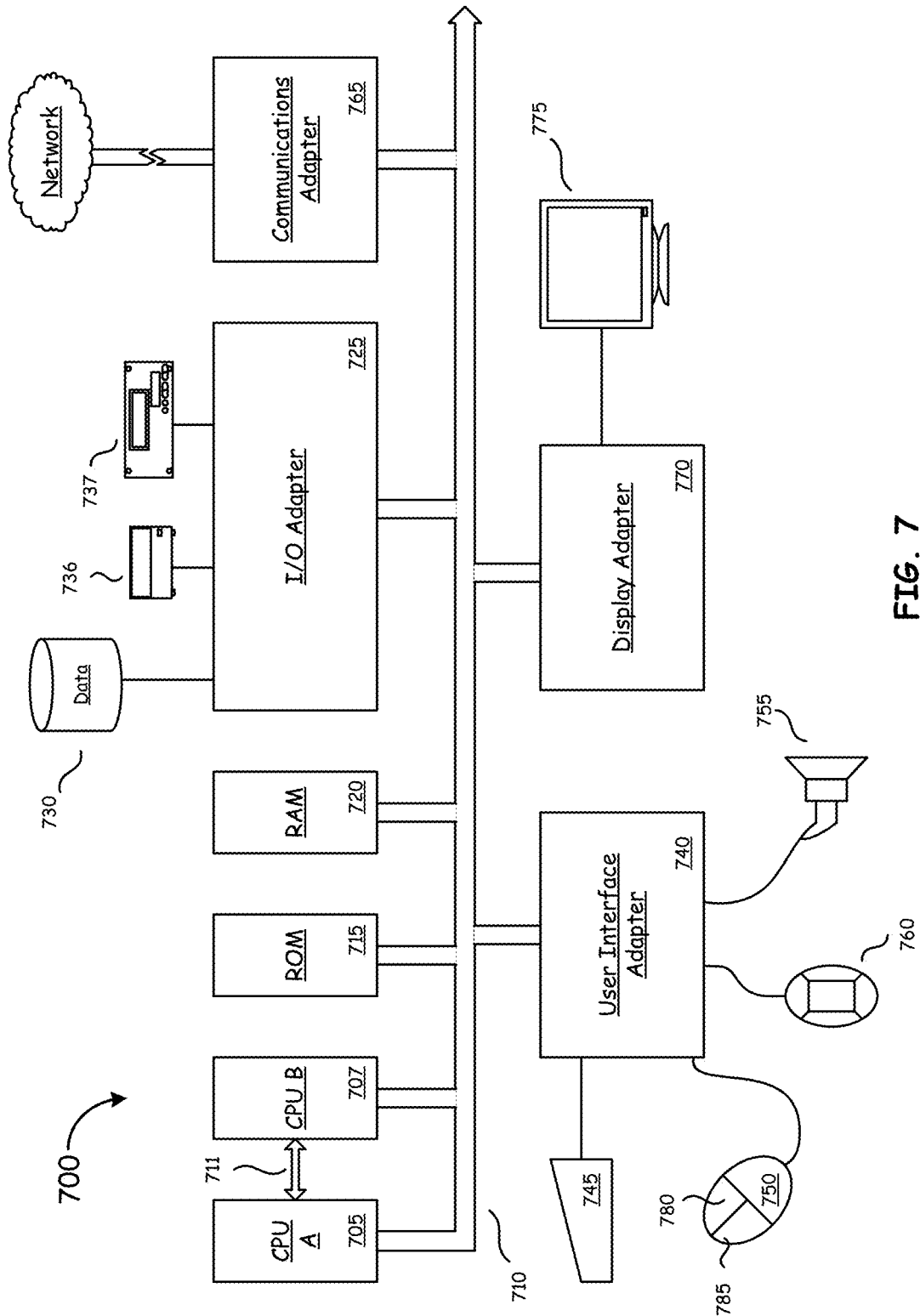

FIG. 6 is a flowchart illustrating a method of broadcasting actionable watermarks to be used by a radio receiver for local insertion of replacement media content, in accordance with various embodiments of the present disclosure; and FIG. 7 is a high-level block diagram of a processing system, part or all of which can be used to implement various servers, machines, systems, and radios in accordance with various embodiments of the present disclosure.

DETAILED DESCRIPTION OF THE INVENTION

In various embodiments discussed herein, a mobile radio, for example an automobile radio or other hybrid radio, includes both one or more over-the-air tuners and a wireless packet-switched network interface. The mobile radio can receive substitute media items via the wireless packet-switched network interface or via an over the air tuner capable of receiving an HD Radio™ radio channel, and store the substitute media items in a local memory, or a memory locally accessible to the mobile radio, for example a passenger's network connected tablet or mobile phone. The mobile radio receives an over-the-air broadcast via a tuned station or media channel, and plays out the media included in the broadcast using a speaker, a display screen, or some combination of a speaker and display screen.

In various embodiments, the mobile radio can play out one or more of the locally stored media items in place of one or more of the broadcast media items. In some embodiments, the radio can determine when a locally stored media item is to be substituted for a broadcast media item by using actionable watermarks embedded in the over-the-air broadcast. For example, a broadcaster can embed one or more watermarks in an over-the-air broadcast, where the watermarks trigger playout of a locally stored replacement media item. The actionable watermarks can be, for example, Frequency Shift Key (FSK) encoded signals and/or or tones, and/or tone(s), Quadrature Amplitude Modulation (QAM) encoded signals and/or tone(s), Amplitude and Phase Shift Keying (APSK) encoded signals and/or tones, and the like. Other types of watermarks can also be used consistent with the disclosure set forth herein. For example, bits or bit patterns can be added to header or footer information in a digital media file, including an advertisement, can be used as a watermark in some embodiments. In other embodiments, an actionable watermark can be inserted into the beginning or ending portion of the media content by altering a sequence or pattern of bits in the main portion of a media item to create an actionable watermark that is computer detectable, but no human perceptible when played out.

In yet other embodiments, an actionable watermark can be a separate file, item, or portion of code inserted into a portion of a broadcast log reserved for watermarks. Watermarks inserted into a watermark "slot" in a broadcast log can be generated at one or more frequencies generally imperceptible to humans, or be of a duration sufficiently short to be consciously imperceptible. Inserting a watermark (or digital fingerprint) into broadcast media, or otherwise embedding a watermark (or digital fingerprint) in a broadcast can be accomplished using any of various techniques known to those of ordinary skill in the art. Detecting and decoding watermarks can also be performed using techniques consistent with the encoding techniques used to embed the watermarks.

In at least one implementation, the mobile radio does not continuously search for, decode, or otherwise process actionable watermarks unless an attention marker is first received by the mobile radio through an out-of-band signal transmitted via a secondary communications channel. In some embodiments, the attention marker can be generated and delivered to the receiver directly or indirectly through a webservice. In response to receipt of the attention marker, the mobile radio can activate, or schedule activation of, a watermark detection module, which processes the over-the-air broadcast content to determine whether a watermark is present.

Watermark detection can be performed during a detection window that is opened in response to receiving the attention maker, or opened at a time indicated by the attention marker. In various embodiments, a detection window can remain open for a predetermined amount of time, or can remain open for a variable period. The end of the variable period can be determined based on expiration of a timer, based on receipt of a rejoin signal, based upon start of replacement media playout, or the like. In some embodiments, the duration of the timer can be fixed for all actionable watermarks, while other embodiments can set a timer duration based on a timer length specified by an attention marker or other out-of-band control signal, content included in a watermark, or the like.

If a watermark is detected in the over-the-air broadcast, the radio can pause, skip, or mute playout of a portion of the broadcast content, and play out locally stored substitute content in place of one or more broadcast items. The playout of the substitute content can be implemented on a per-item basis, e.g. playing out one or more substitute media items in place of one or more broadcast media items, or on a length-of-time basis, e.g. playing out substitute content until a period of time elapses, or until a "return to broadcast" or "rejoin" signal is received.

Various implementations include checks to ensure that valid substitute media is available for playout. If no valid substitute media is available, playout of the over-the-air broadcast can continue uninterrupted. Additionally, various embodiments described herein include mobile radio transmission of playout verification indicating successful or failed playout of substitute media items.

It will be appreciated that additional processing resources required for detecting and decoding watermarks embedded in the over-the-air broadcast can be significant compared to the processing resources required for simply playing out broadcast content on a tuned channel. For example, when an actionable watermark is inserted into a broadcast using FSK tones, an FSK detector/decoder can be used to identify and decode the watermark. Detecting and decoding an FSK encoded signal can be performed using a phased locked loop (PLL) circuit implemented in a combination of hardware and software, which can include discrete components, a special purpose chip, a general purpose digital signal processor, or the like. Leaving the watermark detection circuit in a low-power state unless needed can provide power savings, which can extend battery life, allow the radio to operate at cooler temperatures, and the like.

Unless explicitly stated or otherwise required by context, the terms "fingerprint," "watermark," and "actionable watermark" are used interchangeably to refer to information, such as a pattern of bits or frequencies, inserted into an image, audio file, video file, or other portion of a broadcast. Fingerprints, watermarks, and actionable watermarks are generally not perceptible to humans viewing or listening to the image, audio, or video file, although in some embodiments a watermark can include a human perceptible portion.

Conventionally, watermarks are used to aid in identifying copyrighted works, or in versioning. In at least one embodiment disclosed herein, however, watermarks can include information used to identify an advertisement or other media item to be played out in place of a broadcast media item; timing information indicating how long until a substitution of media items is to begin; a length of time substitution of media items is to continue; a number of broadcast media items to be substituted; an identifier of a not-yet-broadcast media item eligible to be replaced with a substitute media item; a type of media item that can be substituted for an identified broadcast media item; demographic information; priority information; preference information, a category associated with an identified broadcast media item, or other information allowing selection of appropriate substitute media items from among media items.

In at least one embodiment, a watermark can be used to convey information to a radio indicating that a replaceable spot set will be broadcast at some point in the future. For example, a watermark can include information indicating that any or all of collection of spots scheduled be broadcast during the last spot block of the next day's morning's drive time segment can be replaced by locally stored replacement advertisements. The watermark can include, for example, a spot set identifier, timer, or the like. When the appropriate spot set is received, as identified for example by the spot set identifier or by the time of broadcast, the radio can select locally stored replacement items for substitution.

In some implementations, substitution of a broadcast spot set can be restricted to substitution of the entire spot set by a corresponding spot set. Thus, for example, the watermark can specify that a spot set including 3 contiguous or non-contiguous advertisement slots including ads for a particular brand of trucks can be substituted only with a corresponding spot set of different truck advertisements, played out in the same 3 contiguous or non-contiguous advertisement slots. In some implementations, the actionable watermark can include information instructing the radio to request the replacement spot set from a particular source, or using particular request criteria. Thus, a single actionable watermark can trigger multiple present and/or future actions, specify when future actions are to begin, and specify replacement criteria for multiple media items or sets of media items.

Unless explicitly stated or otherwise required by context, the term "radio frequency" is used to refer generally to any of the electromagnetic wave frequencies that lie in the range extending from around 3 kHz to 300 GHz. While including frequencies assigned for use for conventional AM and FM media station signals. the term "radio frequency," is not limited to those frequencies, and should be understood to include for example, frequencies used in Satellite, Television, and any other form of broadcasting.

Figure 1:
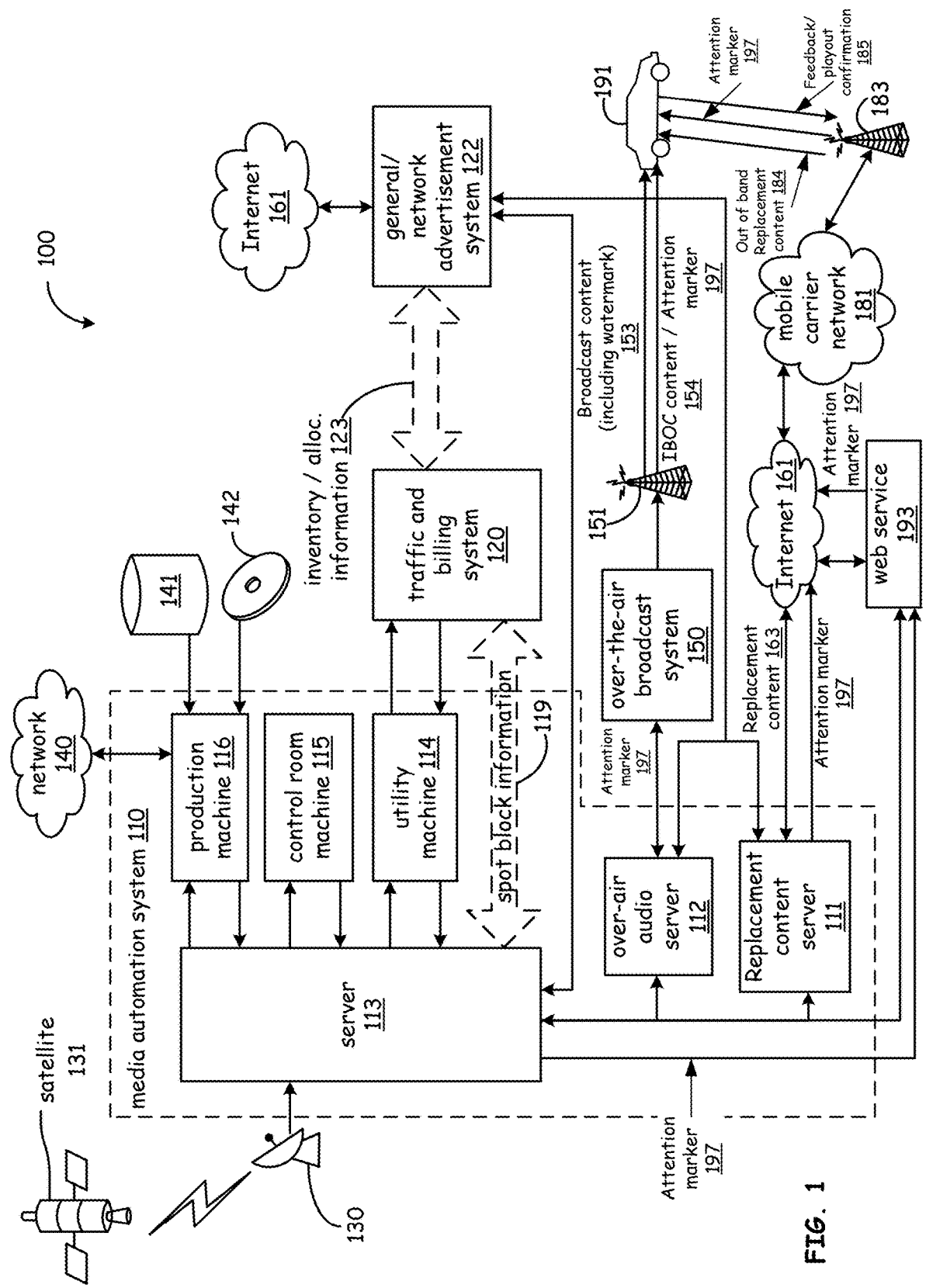
FIG. 1 is a schematic block diagram of a broadcasting system in accordance with various embodiments of the present disclosure.

Referring to FIG. 1, a system 100 will be discussed according to various embodiments of the present disclosure. System 100 includes media automation system 110, for example a NexGen® automation system, which can control and automate various media broadcast functions; and traffic and billing system 120, for example a Viero® traffic system, which can provide control for various traffic and billing functions such as entering and editing orders, and scheduling spots. System 100 can include over-the-air broadcast system 150, through which broadcast station content 153 and in-band-on-channel (IBOC) content 154 can be broadcast to automotive radio system 191, via broadcast tower 151. System 100 can also include one or more communication networks, for example, Internet 161 and mobile carrier network 181, either or both of which can be used to transmit or stream out of band replacement content 184, and to receive feedback and playout confirmation messages 185 to automotive radio system 191, via cell tower 183.

In various embodiments, system 100 can also include a web service 193, such as iHeart Radio®, which can receive history, preference, operating condition feedback, playout confirmation, and other information that can be used to provide a user associated with automotive radio system 191 tailored content. In various embodiments, web service 193 can interact with advertisement system 122, which can include a third party advertisement system, to provide advertisements tailored to the user of automotive radio system 191 based on either or both explicitly provided preferences and inferred preferences.

Various media sources can also be included in system 100, for example, individual source media 142, media database 141, programming from another market received via network 140, and programming transmitted by satellite 131, which can be received via satellite receiver 130. In some embodiments, although not explicitly illustrated, satellite 131 can broadcast content directly to automotive radio system 191. Note that in some embodiments, over-the-air broadcasting can include both satellite-based over-the-air broadcasting and terrestrial over-the-air broadcasting.

System 100 may also include advertisement system 122, sometimes referred to as an external advertisement system, or a network advertisement system, which can be used for provisioning general advertisement content for streaming and broadcast airplay via the traffic and billing system 120, in addition to providing targeted or tailored advertising as requested by web service 193. The traffic and billing system 120 and the advertisement system 122 may communicate with each other, and/or with over-the-air audio server 112 and/or web service 193 to coordinate local and general advertisement content.

In general, traffic and billing system 120 can be used to provide control and monitoring of the sale and scheduling of spot blocks containing one or more spots, and to determine which spot blocks are to be played on which streaming and broadcast stations at particular times. This information can be provided in the form of a log file in some embodiments. Media automation system 110 can use server 113 to gather programming and media information from various sources, and combine that information with spot block information 119 to generate a log file indicating a substantially complete representation of which media and spots are to be broadcast. The log file and related information can be provided to both over-the-air audio server 112 for broadcast, and to replacement content server 111 for delivery of replacement content 163 to automotive radio system 191.

Some or all of the content broadcast using over-the-air audio server 112 or transmitted using replacement content server 111 can include primary and/or advertising content delivered by server 113. In at least some embodiments, content delivered by server 113 includes separate information to be embedded in a broadcast at or near the time of broadcast by over-the-air audio server 112 or over-the-air broadcast system 150. In other embodiments, the content delivered by server 113 can include pre-embedded information. In at least some embodiments, over-the-air audio server 112, replacement content server 111, or over-the-air broadcast system 150 can create, obtain, or embed their own content.

Server 113 can also transmit attention marker 197 to over-the-air audio server 112, replacement content server 111, and/or web service 193 for subsequent out-of-band transmission. For example, attention marker 197 can be delivered to over-the-air audio server 112, which delivers the attention marker 197 to over air broadcast system 150, which transmits the attention marker 197 in an IBOC broadcast using broadcast tower 151. In a similar manner, server 113 can transmit attention marker 197 to replacement content server 111 or web service 193 for distribution to automotive radio system 191 via Internet 161 and/or mobile carrier network 181. In some embodiments, web service 193 or replacement content server 111 can generate and transmit attention marker 197 to automotive radio system 191.

In at least one embodiment, a log file provided to either or both of over-the-air audio server 112 and replacement content server 111 can include substitution information indicating slots in the log file which are potentially available for replacement by substitute media items. This substitution information can include information indicating at what point in the broadcast sequence, or at what particular time, a watermark is to be inserted into the broadcast by over-the-air audio server 112 or over-the-air broadcast system 150. In various embodiments, in addition to or in place of using the broadcast log to specify placement of actionable watermarks in the broadcast, the media items provided by server 113 can be encoded with the actionable watermarks prior to transmitting the media item to over-the-air audio server 112 or over-the-air broadcast system 150.

The actionable watermarks can be encoded into primary broadcast content, for example a song, video, show, or advertisement. Additionally, the media item encoded with the actionable watermark is not necessarily the media item that is eligible for substitution. For example, in at least one embodiment, a watermark can be embedded 1 minute before the end of a song being currently broadcast, where the watermark indicates that song or advertisement broadcast immediately after the end of the current song is eligible for substituted playout. A media item can be said to be eligible for substituted playout if it is eligible to be replaced by a non-broadcast media item. Thus, an advertisement can be eligible for substituted playout based on a watermark encoded non-advertisement. The watermark can also be encoded into media headers or footers, including headers and footers of advertisements. Note that in some embodiments, a watermark embedded in a currently broadcast media item can indicate that the media item in which it is embedded is eligible for substituted playout.

Media automation system 110 can also include production machine 116, which receives media content from network 140, media database 141, individual source media 142, control room machine 115, and utility machine 114, each of which can be connected to server 113. Media automation system 110 can also include replacement content server 111 and over-the-air audio server 112, which provides media content to over-the-air broadcast system 150. Server 113 can provide audio, images, video, or mixed media content to one or both of over-the-air audio server 112 and replacement content server 111. Note that even though audio servers are illustrated and discussed, the techniques and principles described herein can also be applied to images, video and mixed media content.

In at least one embodiment, one or more of the illustrated servers can be implemented as a virtual server implemented on the same hardware as another of the illustrated servers. In each case, however, implementation of a server requires the use of hardware, and general reference to a "server," unless otherwise explicitly stated or required by the context, includes hardware components used to implement the server functionality. Furthermore, various distributed processing techniques can be used to spread functionality of one or more of the illustrated servers across multiple different machines.

Traffic and billing system 120 is, in some embodiments, connected to server 113 via a utility machine 114. In other embodiments, traffic and billing system 120 may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems.

In various embodiments, spot block information 119 can include requests for identification of potential spots available for inclusion in an under-filled spot block, responses to such requests, bumped spot notifications, broadcast logs and lists, spot files, parameters related to available, unavailable, and potential spots, spot block parameters, ranks, conditional information, various status information related to spots, and the like.

Also, traffic and billing system 120 can be connected to advertisement system 122. Advertisement system 122 can, in various embodiments, operate to provide network inventory directly to media automation system 110 for broadcast in accordance with a broadcast log specifying inventory allocations 123 generated by the traffic and billing system 120. Traffic and billing system 120 can provide the broadcast log to server 113 of media automation system 110. In some embodiments, the broadcast log can include entries that specify spots reserved for playout of local inventory by media automation system 110, and placeholder, or network, entries specifying particular portions of spot blocks reserved for playout of network inventory by advertisement system 122.

The embedded information included in broadcast station content 153 can include, but is not limited to, a station identifier such as a station call sign, a station affiliation or group membership indicator, a time stamp, one or more attention markers, and/or one or more actionable watermarks. Information can be embedded in a broadcast signal using various techniques, including, using a Radio Data System (RDS) protocol, using in-band-on-channel (IBOC) techniques such as those used in HD Radio™ transmissions, and various known watermarking and encoding techniques.

In at least one embodiment, the embedded information is received at automotive radio system 191 after a user tunes the automotive radio system 191 to the appropriate channel. Automotive radio system 191 can extract some or all of the data embedded in the broadcast, for example to determine the identity of the broadcast station. In at least one embodiment, extraction of information embedded using watermarks can be delayed until after automotive radio system 191 detects receipt of an out-of-band attention marker. For example, in response to receipt of an out-of-band attention marker, automotive radio system 191 can activate a watermark detector, and begin attempting to detect embedded watermarks for a fixed or variable period of time based upon expiration of a detection timer. Detecting and decoding watermarks can be a processor intensive operation, so waiting to perform watermark detection in response to receipt of an attention marker can reduce the overall amount of signal processing power required by automotive radio system 191.

In response to detecting a watermark, advertisements and other information stored locally at automotive radio system 191 can be substituted for particular broadcast content based on the detected watermark. For example, in at least one embodiment, targeted advertisements and other content delivered out-of-band to automotive radio system 191 for storage can be associated with particular watermarks, or watermark information, and items having attributes that match requirements included in a broadcast watermark can be selected.

A stored media item can be said to be associated with a detected watermark if the attributes of the stored media item match attributes indicated by information included in the watermark to a given degree. Thus, a stored media item can be said to be associated with a detected watermark, in some cases, if the detected watermark includes watermark information that references, names, specifies, or otherwise identifies the stored media item. In some embodiments, greater than 50% of the attributes can be required for a match, while in other embodiments, a given number of attributes are required before a match is indicated. In some embodiments various attributes can be weighted, rated, or otherwise scored, and determination of a match takes into consideration the weights assigned to particular attributes.

In various embodiments, the watermark information obtained from the detected watermark can identify a class of allowable substitute items, e.g. advertising content or non-advertising content; one or more categories or category combinations associated with allowable substitute items, e.g. gardening, trucks, or home improvement, allowable lengths of substitute items, e.g. between 15 and 18 seconds; allowable items genres, preferred items, categories, classifications, etc.; prohibited items, types, categories, etc.; and other similar information. Thus, in some embodiments a particular stored media item can be said to be associated with a detected watermark even if the detected watermark does not specifically specify or name that media item, as long as the attributes match to within a threshold level.

In some embodiments, web service 193 can provide information about a user of automotive radio system 191, or passengers nearby the automotive radio system 191, to media automation system 110, advertisement system 122, over-the-air broadcast system 150, web service 193, or traffic and billing system 120. The information can include, but is not limited to, various historical, demographic, preference and other information, e.g., regular passengers, travel routes, tuning histories, age, gender, social media memberships, and the like, which can be used to allow selection of targeted advertisements or other media items to be delivered to automotive radio system 191 for later substitution. For example, if a mother is driving a vehicle with 4 passengers, and each of the passengers have been identified as teenage boys, locally stored advertisements targeted to the 4 teenage boy passengers can be selected for playout, even though the selected advertisements would not be selected based solely on information related to the primary user of the radio, i.e. the mother. In some embodiments, information about the passengers and the primary user of the radio can be weighted and combined, so that when media content is selected for replacement, content that is the least likely to displease any of the passengers or the primary user can be selected. Additionally, the information about the passengers and user can be considered in determining which broadcast media items automotive radio system 191 is allowed to replace with substitute content.

In some embodiments, media automation system 110 can provide information received from web service 193 to advertisement system 122, allowing advertisement system 122 to provide appropriately targeted advertisements to replacement content server 111. Replacement content server 111 can then pre-deliver the targeted advertisements to automotive radio system 191 using an out-of-band radio transmission, for example through mobile carrier network 181 and cell tower 183. In some embodiments, web service 193 can deliver information to advertisement system 122 via Internet 161 instead of, or in addition to, delivering that information to media automation system 110. In most embodiments, however, media automation system 110 and/or traffic and billing system 120 are informed of which advertisements are delivered to automotive radio system 191.

Advertisement system 122 can deliver customized advertisements directly to automotive radio system 191 via Internet 161 or mobile carrier network 181. In some such cases, advertisement system 122 can simply report to traffic and billing system 120, server 113, over-the-air audio server 112, replacement content server 111, or some combination thereof, various information associated with advertisements delivered directly to automotive radio system 191. The reported information can include, but is not limited to, identification of directly delivered advertisements, time-to-live associated with the advertisements, time of delivery, identification of automotive radio system 191 or a network address associated with automotive radio system 191, identification of a corresponding streaming station into which the directly delivered advertisements are to be inserted, and the like. In other embodiments, however, advertisements can be delivered to automotive radio system 191 via media delivery mechanisms associated with media automation system 110, including delivery via a content distribution network included in or associated with replacement content server 111.

Advertisement system 122 can select custom advertisements to be inserted as replacement content 163, or to be delivered to automotive radio system 191 for later insertion based on profile, demographic, registration, history of usage, or other information collected using automotive radio system 191, or obtained from a user or passenger profile associated with the web service 193.

Various system configurations can be used to implement the teachings set forth herein, and are not limited to the exact configurations discussed with reference to FIG. 1. For example, although at least one embodiment includes separate traffic and billing systems, similar functionality can be provided using a single, integrated or system having one or more local or distributed processing, storage and communication elements. Thus, although embodiments including automation and traffic systems are primarily discussed herein, other embodiments can be implemented without the need for cooperation between separate automation and traffic systems.

Figure 2:
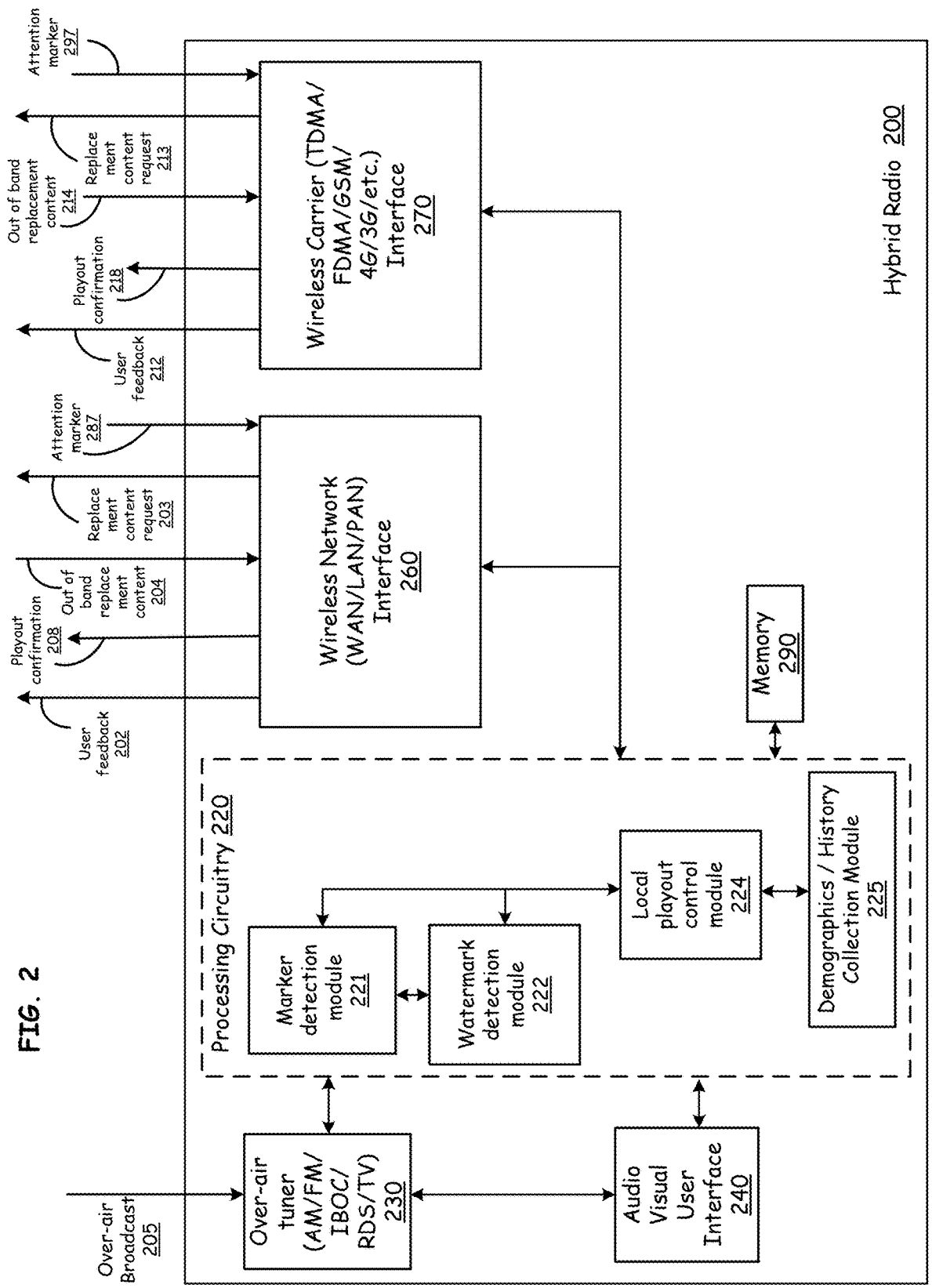
FIG. 2 is a schematic block diagram of a hybrid automotive radio or other type of media receiver having both a packet-switched network interface and an over-the-air radio tuner, in accordance with various embodiments of the present disclosure.

Referring next to FIG. 2, a hybrid radio 200 will be discussed according to various embodiments of the present disclosure. Although this disclosure focuses on an automotive radio, the teachings set forth herein can be applied to other types of hybrid radios and devices, e.g. devices including an over-the-air tuner and a network interface capable of two-way communication via a wide area network, including but not limited to "smart phones" that incorporate broadcast FM radio tuners, and "smart TVs" that include wireless local area network interfaces and over-the-air tuners.

Hybrid radio 200 includes tuner 230, interface 240, processing circuitry 220, memory 290, network interface 260, and wireless carrier interface 270. Tuner 230 can include radio receiver circuitry used to receive radio frequency broadcasts in the amplitude modulation (AM) band; in the frequency modulation (FM) band, including signals transmitted in accordance with in-band-on-channel (IBOC) techniques and radio data system (RDS) transmissions, and/or in other radio frequency transmission bands used to broadcast media content to consumers, including frequency bands used for broadcasting television or satellite programs. Thus, although the present disclosure focuses generally on AM/FM radio broadcasts, with a streaming radio station being substituted for an over-the-air AM/FM radio broadcast, similar techniques can be applied to television, satellite, and/or streaming media.

Interface 240 can include audio, video, tactile, or other input and output devices capable of obtaining information from a user, and presenting information to a user, including a display screen, a speaker, and/or outputs connecting hybrid radio 200 to external display screens or speakers used to present audio and/or visual content received via an over-the-air broadcast station.

Memory 290 can be used by processing circuitry 220 to store various information, including, but not limited to: a tone-text code table, a tuning history associated with hybrid radio 200; a location history; user demographic; preference; registration; network addresses and/or identification information associated with one or more media stations; replacement media items, such as advertisements or other primary/non-primary content delivered in advance of a media broadcast for potential broadcast media substitution based on one or more actionable watermarks; information associating particular replacement media items with particular watermarks, and the like.

The information associating particular watermarks may include a copy of an actionable watermark that has been pre-associated with one or more particular media items;

information identifying an actionable watermark that has been pre-associated with a particular media item; and media item information to be matched against information specified by an actionable watermark, e.g., category, genre, media type identifier, media item source, placement priority, and media item length or other timing information.

Network interface 260 can be a wired (not explicitly illustrated) or wireless network interface that communicates via a packet switched network according to various communication standards such as IEEE 802.xx, which specifies communication standards such as 802.11 for wireless local area networks (WLAN), IEEE 802.3 for Ethernet, and IEEE 802.15 for personal area networks, or the like. Wireless carrier interface 270 can allow communication using any of various protocols used by cellular/mobile phone carriers to allow the transmission of data between mobile devices, or between mobile devices and the Internet. Such communication standards can include General Packet Radio Service (GPRS), Global System for Mobile communication (GSM), Universal Mobile Telecommunications Service (UMTS), Code Division Multiple Access (CDMA), Frequency Division Multiple Access (FDMA), Long Term Evolution (LTE), or the like.

Media items received via either network interface 260 or wireless carrier interface 270 are referred to herein as being received "out of band." Thus, attention markers 287 and 297 are considered to be received out-of-band. Similarly, media items and/or attention markers received in a sideband of a tuned station are considered, for purposes of this disclosure, to be "out of band," even though IBOC content broadcast in a sideband is sometimes referred to as "in band" in other contexts. Essentially, the term "out of band" is used herein as shorthand to refer to content not received from the tuned station's over-the-air broadcast. Thus, if a radio is tuned to an analog FM station broadcasting on 96.9 MHz, and the broadcast content from FM station 96.9 MHz is being presented to a user, any content received from other than the tuned analog frequency can be considered "out of band" for purposes of this disclosure, even if such content is broadcast or multicast, and even if such content is broadcast in a sideband of the FM 96.9 MHz station.

Processing circuitry 220 can include marker detection module 221, watermark detection module 222, local playout control module 224, and collection module 225. In operation, tuner 230 may receive and demodulate an over-the-air broadcast from a tuned broadcast station, and provide the demodulated output to processing circuitry 220 and/or interface 240. In some embodiments, tuner 230 includes all of the necessary circuitry and software to generate user-perceptible output, without assistance from processing circuitry 220. In other embodiments, processing circuitry 220 can process the demodulated output of tuner 230, and deliver broadcast station content to interface 240 for output and presentation to a user. In various embodiments, even if tuner 230 provides its output directly to interface 240, the demodulated output can also be sent to processing circuitry 220, where during an activated state, watermark detection module 222 can extract information embedded in the over-the-air broadcast signal, such as an attention marker or an actionable watermark. Note that in some cases where embedded information is received in a sideband, or otherwise requires additional decoding prior to being processed, tuner 230 can be used in conjunction with marker detection module 221 and/or watermark detection module 222 to extract the embedded information from the broadcast signal.

In various embodiments, the watermark embedded in the over-the-air broadcast can be a Frequency Shift Key (FSK) tone, a series of FSK tones, or another embedded signal that would normally be filtered out of the over-the-air broadcast signal during demodulation or post-demodulation processing. Generally, tuner 230 will filter over-the-air broadcast signal 205 to remove from over-the-air broadcast signal 205 most frequencies not intended to be played out to a user. In some embodiments, watermarks implemented using FSK tones embedded in over-the-air broadcast signal 205 can be generally in the 12 KHz to 13 KHz range, although other frequencies can be used.

Tuner 230 can, in some embodiments, filter out any frequencies between, for example, 5 KHz and 20 KHZ, and provide the filtered signal to watermark detection module 222. Watermark detection module 222 can include any suitable watermark detection circuitry, including any of various FSK detection and/or FSK data extraction circuitry, including for example, a CY8C27xxx chip by Cypress®. Building a watermark detector/decoder is well within the capabilities of one having ordinary skill in the art.

In various embodiments, the marker detection module 221 can be used, alone or in conjunction with tuner 230, to detect the presence of an out-of-band attention marker received in an IBOC transmission. In other embodiments, marker detection module can receive and process an attention marker received from network interface 260 and/or wireless carrier interface 270. For example, attention marker 297 can be received via wireless carrier interface 270, and processed by marker detection module 221 to extract any attention markers that may be present. In other embodiments, the attention marker can be identified by processing circuitry 220 during the normal course of processing data packets, and any data packets, or portions of data packets, identified as attention markers can be delivered to marker detection module for further processing and information extraction.

Marker detection module 221 can also be used, alone or in conjunction with watermark detection module 222, to detect a rejoin marker or signal embedded in over-the-air broadcast signal 205 or received via an out-of-band transmission (not explicitly illustrated). In various embodiments, the rejoin marker can be a second watermark, and watermark detection module 222 can remain in an active state, e.g. detecting watermarks, until a rejoin marker is received. In other embodiments, an activated watermark detector module can re-enter a low power state after a preset period of time, and then be reactivated for detection of a rejoin marker in response to marker detection module receiving another attention marker. In some embodiments, a rejoin marker, or second watermark, can have a different frequency than a first watermark, allowing a rejoin marker to be differentiated from other types of actionable water marks based on the difference in frequency. A rejoin marker can also be received in an out-of-band transmission via a secondary communication channel, such as network interface 260 or wireless carrier interface 270.

In some embodiments, an actionable watermark can include binary or non-binary tone text corresponding to particular codes in a tone-text catalog or code table stored in memory 290. The tone-text codes can correspond to codes representing, for example, a spot length, a top-of-the-hour (TOH) indicator, a time of day, a media source identifier, a media source, a rejoin or return to broadcast indicator, a timer duration, or similar information that can be used to substitute locally stored content for broadcast content. Tone-text codes can also indicate one or more actions to take in response to receiving the watermark, for example, start a timer, send an application program interface (API) request for replacement content to a specified replacement content source, or the like.

Tone text included in an actionable watermark can, in various embodiments, be created by using different frequency FSK signals to represent 1's and 0's, e.g. marks and spaces. For example, an FSK tone having a frequency of 12,200 Hz can be used to represent a mark, and an FSK tone having a frequency of 13,200 Hz can be used to represent a space. The two different FSK frequencies can be transmitted in a specified sequence, and used to provide a binary representation of ascii (American Standard Code for Information Interchange) characters.

In response to detecting an out-of-band attention marker or an out-of-band rejoin signal, marker detection module 221 can generate and transmit a "marker detected" signal to watermark detection module 222 and/or local playout control module 224. The marker detected signal can be used to activate watermark detection module 222, either directly or through local playout control module 224, or to cause watermark detection module 222 to leave an idle or low-power state and enter an active detection state. In at least one embodiment, marker detection module 221 can also transmit to local playout control module 224 an informational signal including information extracted from the attention marker or the rejoin signal.

In some implementations, watermark detection module 222 remains in an off, idle, or other low power state until activated by a control signal from local playout control module 224 or by a signal from marker detection module 221 indicating that an out-of-band attention marker has been detected. Watermark detection module 222 can remain in the active detection state for a predetermined period of time, until a power-down control signal is received from local playout control module 224, or until a signal from marker detection module 221 is received indicating that a rejoin signal has been detected.

In its low power or idle state, watermark detection module 222 does not necessarily perform signal processing operations normally used for detecting and/or decoding watermarks that may be have been embedded in over-the-air broadcast signal 205. Instead, watermark detection module 222 can simply wait for receipt of an activation control signal or an attention marker detected signal. In response to receiving an activation control signal or an attention marker detected signal, watermark detection module 222 can begin actively processing demodulated over-the-air broadcast content to detect watermarks embedded in the broadcast.

The watermarks in the broadcast may have been embedded using any of various known watermark encoding techniques in either the main body of a primary content media item, in the main body of an advertisement, in headers or footers associated with primary broadcast content or advertisements, or across a series of media items. Watermark detection module 222 can use a known watermark detection and decoding technique to process the embedded watermarks, where the detection and decoding technique can be selected based on the type of watermark encoding used by embed the watermarks. In some embodiments, watermark detection module 222 can be implemented using a processor similar to those employed for cellular communications, graphics processing, a general purpose processor, discrete logic components, or a combination of hardware and software components.

In response to detecting the presence of an embedded watermark, watermark detection module can generate a "watermark detected" signal that causes local playout control module 224 to take some action. Because the presence of an embedded watermark can initiate performance of an action, the embedded watermarks and are sometimes referred to herein as "actionable watermarks."

Watermark detection module 222 can also transmit information extracted from decoded watermarks to local playout control module 224 for use in generating various playout control signals, and in requesting, selecting, or verifying replacement media items. Examples of the information that can be extracted from an actionable watermark include, but are not limited to: replacement media identifiers; information associating a specific broadcast media item with a specific replacement media item; advertiser identifiers; advertising class identifiers; timing information; replacement eligibility information; preferred demographics, genres, categories, and classifications; blacklist or whitelist identifiers; and ranking or priority information.

Local playout control module 224 can perform a number of different functions, or combinations of functions, related to playout of replacement media items. For example, local playout control module 224 can generate and transmit various control signals to watermark detection module 222. Local playout control module 224 can also obtain, select, verifying, delete, store, refresh and otherwise manage replacement media items. Additionally, local playout control module 224 can control whether and when replacement media items are delivered to interface 240, and generate control signals used to mute, un-mute, pause, and restart playout of broadcast content when replacement media items are being played out.

The control signals sent by local playout control module 224 to watermark detection module 222 can include, but are not limited to, an activation, or wake-up signal, and a deactivation, or sleep signal. For example, an activation control signal can be transmitted to watermark detection module 222 by local playout control module 224 in response to detection of an attention marker by marker detection module 221. A deactivation control signal can be transmitted to watermark detection module 222 by local playout control module 224 in response to detection of a rejoin signal, in response to a watermark detection window closing, in response to a watermark or other information embedded in a replacement media item, in response to completing playout of a substitute media item, or the like.

In performing its various functions, including generating various control signals, local playout control module 224 can make decisions based on information provided by watermark detection module 222, collection module 225, and/or marker detection module 221. For example, local playout control module 224 can select an appropriate replacement item to retrieve from storage in memory 290 based on a replacement media item identifier extracted by watermark detection module 222 from over-the-air broadcast signal 205. In this example, local playout control module 224 can match the identifier provided by watermark detection module 222 with an identifier associated with a stored advertisement.

In another example, the information extracted by watermark detection module 222 may indicate that the second advertisement in the spot block occurring at the top of the next hour is eligible to be replaced with an advertisement having particular demographic and type characteristics. Local playout control module 224 can search for a valid replacement media item stored in memory 290 that matches, or is associated with, the specified demographic and type characteristics, and queue that replacement media item to be played out using interface 240 at the appropriate time.

When the second advertisement in the spot block occurring at the top of the next hour is received at hybrid radio 200, as determined by processing circuitry 220, local playout control module 224 can transmit a "mute broadcast" signal and a "play out queued media signal" to interface 240, causing the selected replacement media item to be played out in place of the broadcast media item originally included in over-the-air broadcast signal 205.

In another example, the information extracted from an actionable watermark can indicate that a particular advertisement is to be replaced, specifying allowable media item lengths, and prohibited content, but not specifying preferred replacement content characteristics. In some such embodiments, local playout control module 224 can select one of the stored replacement media items based on information obtained from collection module 225. In this way, some embodiments allow for different recipients to be provided different replacement media items selected local to the user. This technique can be useful, in some circumstances, to allow a user's demographic and history information to be maintained locally, without requiring transmission of potentially personal information outside of a device that is under the user's own control.

If, during the selection process, local playout control module 224 determines that there is no suitable, valid replacement media item stored in memory 290, local playout control module 224 will not instruct interface 240 to break away from playing out broadcast content, despite detection of an actionable watermark indicating that a particular broadcast media item is to be replaced. The inability to select replacement content, for example due to the inability to match specified criteria, can be reported to an advertisement provider or other entity, along with a request for replacement content having the criteria that was not able to be matched.

In various embodiments, local playout control module 224 can generate a playout confirmation 208 to be sent via network interface 260, and/or playout confirmation 218 to be sent via wireless carrier interface 270. The playout confirmation 208 or 218 can be sent to a web service 193, to broadcaster, to a media automation system 110, to an advertisement system 122, to a traffic and billing system 120, or elsewhere. Playout confirmations 208 and 218 can be useful in proper accounting to advertisers, in the case of replacement advertisements, and copyright holders in the case of replacement primary media content. In various embodiments, playout confirmations 208 and 218 can be used to report a failure to identify and select suitable, valid replacement content during the replacement media selection process.

In some implementations, a "watermark detected" signal from watermark detection module 222, or an "attention marker detected" signal from marker detection module 221, can trigger local playout control module 224 to send a request for replacement content, e.g. replacement content request 203 via network interface 260 and replacement content request 213 via wireless carrier interface 270. A request for replacement content can be sent directly or indirectly to web service 193, advertisement system 122, a broadcaster, a media automation system 110, a traffic and billing system 120, or the like.

In response to a request for replacement content, web service 193, advertisement system 122, a broadcaster, media automation system 110, or traffic and billing system 120, can transmit replacement content, e.g. out of band replacement content 204 received via network interface 260, and out of band replacement content 214 received via wireless carrier interface 270, to hybrid radio 200. The replacement content can include, or be transmitted in conjunction with, information including characteristics and identifying information associated with the replacement content, and usable to match or associate the replacement content with an actionable watermark. The characteristics can include expiration information indicating how long the media item can be used before becoming stale and unusable, source information indicating a source of the content, address information indicating where to send playout confirmations, watermark identifiers linking a particular media item to a particular watermark, blacklist information indicating items for which a particular media item should not be substituted or shows in which advertisements should not be placed, and other similar information.

In some embodiments, local playout control module 224 can check the validity of replacement media items upon receipt, periodically, and/or during the selection process. Invalid items can be deleted and reported in a playout confirmation message, such as playout confirmation 208 and playout confirmation 218.

In various embodiments, some or all of the information used by local playout control module 224 can be obtained from web service 193, another service to which a user of hybrid radio 200 belongs, from collection module 225, or from some combination of these and other sources. In at least one embodiment, collection module 225 can locally collect information including, but not limited to: user preferences; a tuning history and usage patterns; location information; time and date information; signal quality information; and the like. Collection module 225 can associate and correlate collected information, for example to determine, a location, time of day or other condition at which a user or passenger typically tunes away from a broadcast station, whether a different user is operating hybrid radio 200 at different times or location, and whether a particular passenger or driver of a vehicle in which hybrid radio 200 is located typically initiates tuning events. Information collected or generated by collection module 225 can be stored in memory 290 for later use by local playout control module 224. In addition to storing information in memory 290, collection module 225 can send some or all of the information collected to web service 193 in a user feedback message, such as user feedback 202 via network interface 260, or user feedback 212 via wireless carrier interface 270.

Collection module 225 is generally, though not necessarily, operating substantially continuously whenever hybrid radio 200 is powered on. Collection module 225 can periodically, in response to a request, in response to user interaction with interface 240, or otherwise, transmit user feedback 202 or 212 to web service 193, and store information associated with user feedback to memory 290 for use by local playout control module 224.

Figure 3:
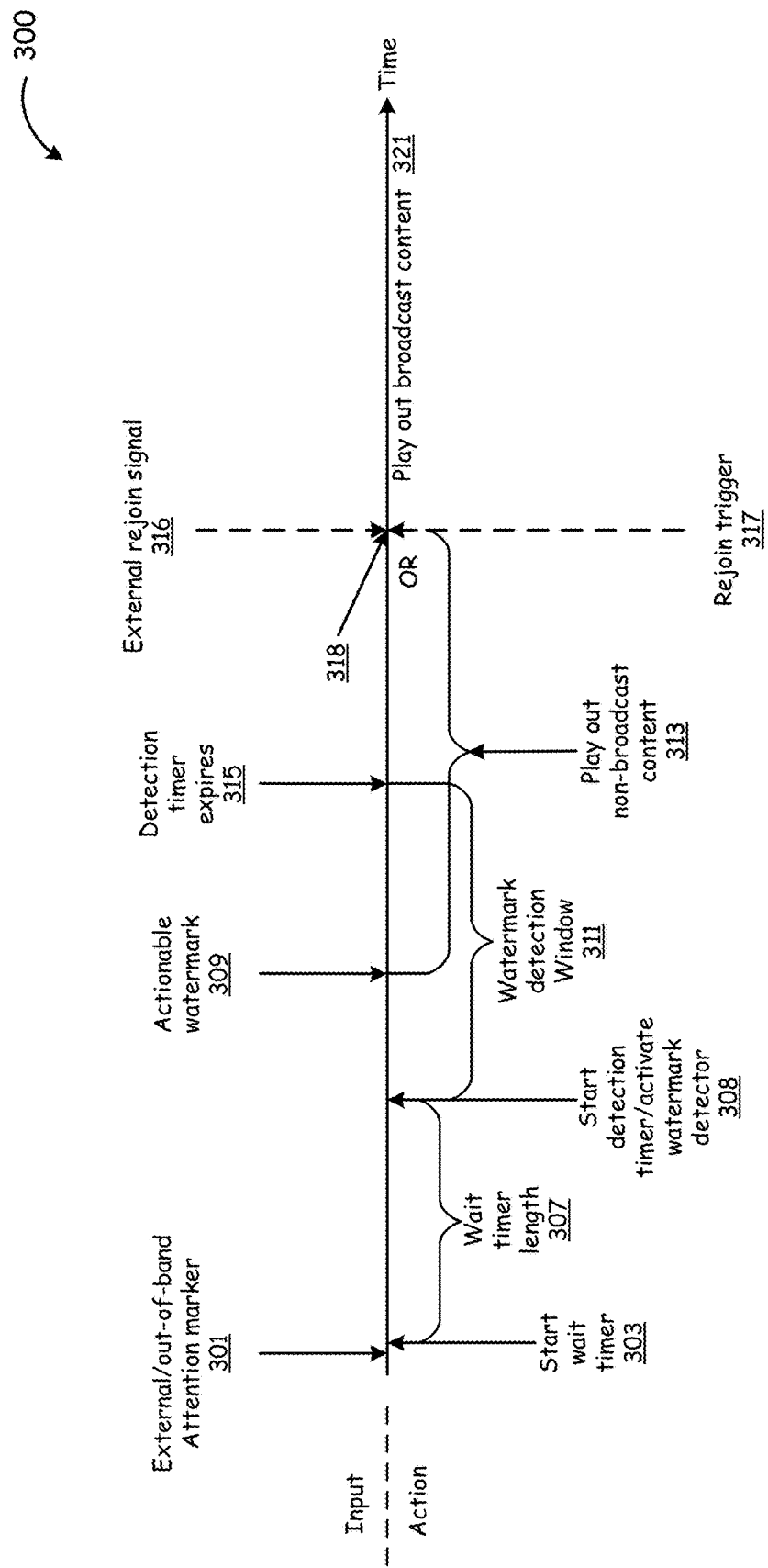
FIG. 3 is a timeline illustrating a sequence of events in which watermark detection processing is commenced in response to a watermark notification signal, or attention marker, and non-broadcast content is played out in response to detection of the watermark, in accordance with various embodiments of the present disclosure.

Referring next to FIG. 3, a timeline 300 illustrating a sequence of events that take place at a radio receiver will be discussed, in accordance with various embodiments of the present disclosure. The sequence of events illustrated by timeline 300 shows an embodiment in which watermark detection processing can be commenced in response to a watermark notification signal, or attention marker, and non-broadcast content can be played out in response to detection of the watermark. This sequence of events can prevent unnecessary resource usage, including but not limited to unnecessary power consumption, by leaving a watermark detector in an idle state until activated by an attention marker.

As illustrated by timeline 300, an external/out-of-band attention marker can be received at time 301. Receipt of the attention marker can activate a wait timer at time 303. The wait timer has a duration, or timer length 307, which expires at time 308, and upon expiration of the timer at time 308, a watermark detection window 311 can opened by activating a watermark detector. A detection timer can also be started at time 308.

In some embodiments, the attention marker can be received approximately 1 minute in advance of an actionable watermark, so that timer length 307 can be set to 1 minute, or slightly less, to ensure that the watermark detection window is open by the time an actionable watermark is received. Other timing can be used in some implementations, so long as it provides adequate time for replacement media to be prepared for substitute playout, but in some embodiments the timer length is less than about 5 minutes and more than about 2 seconds.

An actionable watermark is received at time 309, which is during a time when watermark detection window 311 is open, so that the actionable watermark can be recognized and acted upon. In the illustrated embodiment, the actionable watermark is acted upon by playing out locally stored replacement content in place of broadcast content beginning at time 309. Although not explicitly illustrated, there may be a small processing delay, typically less than 1 second, between detection of the actionable watermark at time 309 and the beginning of non-broadcast content playout 313. Note that in some embodiments, a watermark can be embedded in an over-the-air broadcast multiple times, for example by embedding the watermark in multiple media items or by embedding the watermark multiple times in the same media item, to help ensure detection of the watermark.

In some embodiments, if two identical watermarks are received, only the first one (or the last one) is acted upon. In other embodiments, when multiple watermarks are transmitted, each watermark can include a watermark identifier, so that a single action is not inadvertently triggered multiple times.

Watermark detection window 311 can be closed at time 315, upon expiration of a detection timer. In some embodiments, watermark detection window 311 can remain open for a length of time specified by information included in the watermark. In other embodiments, the duration of the watermark detection window 311 can be a fixed or configurable length of time. Receipt of a second attention marker (not illustrated) can be used in some embodiments to keep the watermark detection window open for a longer, or shorter, period of time.

Playout of non-broadcast, replacement content can continue for variable time periods, depending on the implementation, based on information extracted from a watermark, based on the availability of suitable, valid replacement content or the like. For example, an actionable watermark can specify that a single broadcast advertisement can be replaced by a single replacement advertisement, that any or all advertisements in a spot block can be replaced by any number or type of replacement media item, subject to the time constraints of the spot block, or that non-broadcast replacement content is to be played out until a rejoin signal or marker embedded in the broadcast is received.

Timeline 300 shows that playout of non-broadcast content continues until a local rejoin trigger 317 is generated or an external rejoin signal 316 is received at time 318. For example, a local playout controller can generate a local rejoin trigger 317 based on expiration of a timer, in response to a lack of available replacement content, in response to a user tune-away event, in response to completing playout of a designated number of non-broadcast items, in response to completing playout of a particular replacement item. or in response to being notified that a rejoin marker, e.g. a second or subsequent watermark, has been detected. Note that where a second or subsequent watermark is used as a rejoin signal, watermark detection window 311 can remain open, or be reopened based on receipt of a second attention marker. In some embodiments, an external, or out-of-band rejoin signal 316 can be received via a secondary communications channel.

In various embodiments, playout of broadcast content 321 is resumed substantially immediately upon termination of non-broadcast playout at time 318. In some such embodiments, the local radio can perform a fade or other transition operation to cover potentially rough switches between playout of broadcast and non-broadcast content.

Figure 4:
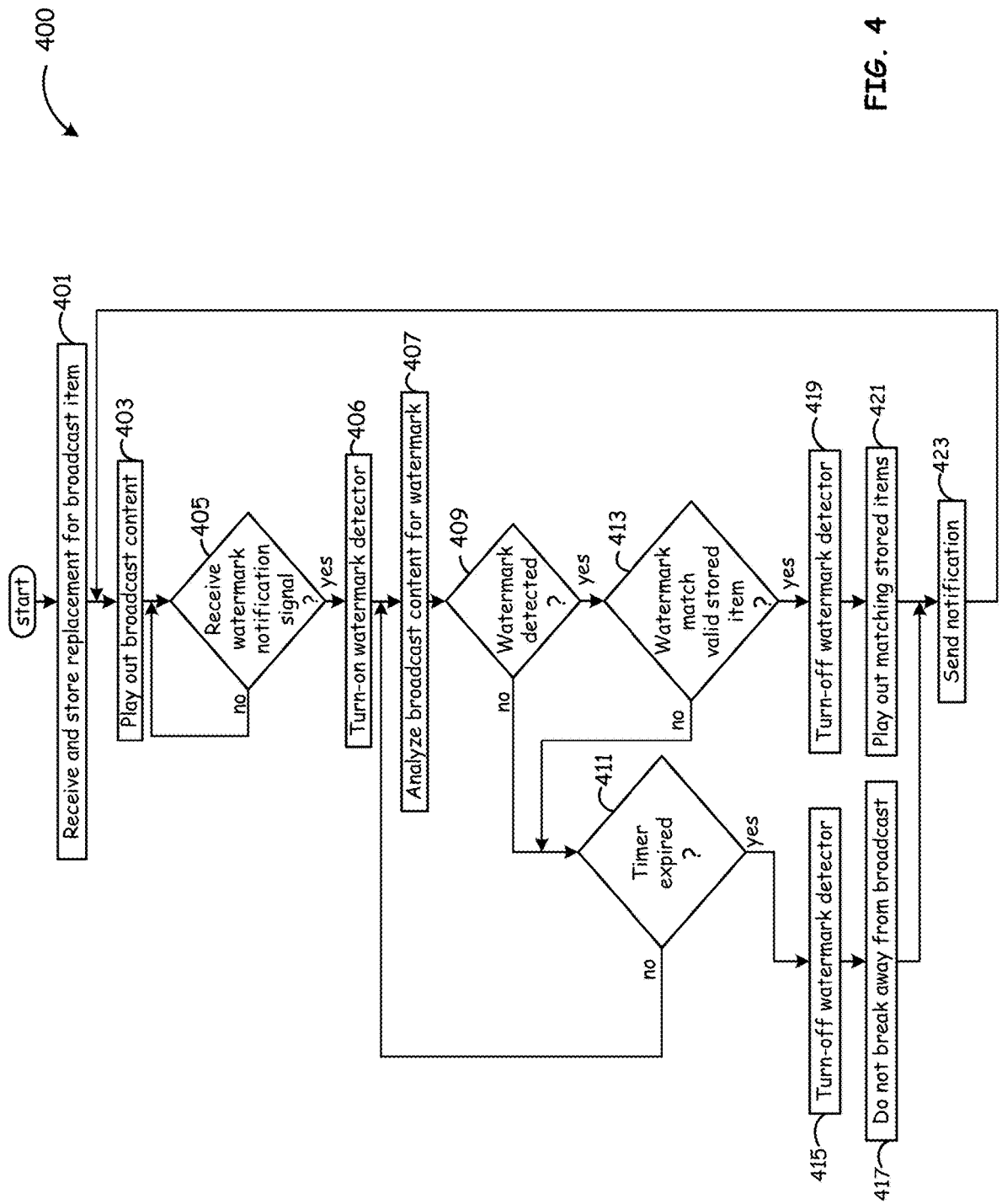
FIG. 4 is a flowchart illustrating a method of substituting stored media items for broadcast media items using a watermark detector that can be turned on or off, in accordance with various embodiments of the present disclosure.

Referring next to FIG. 4, a flowchart illustrating a method 400 of substituting stored media items for broadcast media items will be discussed in accordance with various embodiments of the present disclosure.

As illustrated at block 401, a mobile radio can receive and store replacement media items and information that can be used to associate the replacement media items with actionable watermarks. The replacement media items can be received from an out-of-band source, such as a local area network (LAN) connection, a personal area network (PAN) connection, a cellular carrier network, an in-band-on-channel (IBOC) broadcast, a satellite broadcast, or the like. The replacement media items are sometimes referred to herein as "non-broadcast content," because they are received at the mobile radio from a source other than an over-the-air broadcast station and/or channel being played out to a user of the mobile radio. The replacement content can include, but is not limited to advertising media, primary media content, such as songs, shows, media filler, talent spots, or some combination thereof.

As illustrated at block 403, broadcast content received via an over-the-air broadcast signal is played out to a user, i.e. a viewer and/or listener. During receipt of the over-the-air broadcast content, a check can be made to determine whether a watermark notification signal has been received. A watermark notification signal, sometimes referred to herein as an out-of-band attention marker, can indicate that an embedded watermark will be arriving soon, and that the radio should begin the process of looking for embedded watermarks.

If it is determined that a watermark notification signal, or attention marker, is received at block 405, a watermark detector can be activated, as illustrated at block 406. If no watermark notification signal is detected at block 405, method 400 can loop back and continue to execute block 405 until a watermark notification is received.

As illustrated at block 407, the watermark detector can be used to analyze the broadcast content and identify the presence of an actionable watermark embedded in the over-the-air broadcast signal. During the watermark detection process, if it is determined that no watermark has been detected, as illustrated at block 409, a further determination can be made on a one-time, continual, or periodic basis, regarding whether a detection timer has expired, as shown by block 411. In some embodiments, block 411 can include a more generalized check to determine whether watermark detection should be suspended or continued. The more generalize check can be based on, for example, expiration of a timer, receipt of a rejoin signal, receipt of a control signal, a tune-away event, or the like.

If the detection timer has expired, and watermark detection is to be discontinued, the watermark detector can be turned off, as illustrated by block 415. As shown by block 417, the radio will not break away from playing out broadcast content, and a notification can be sent, as illustrated by block 423. In various embodiments, the notification can be sent to a web service, an advertisement system, a traffic and billing system, a broadcast system, a media automation system, or the like. Method 400 can subsequently return to block 403. If the detection timer has not expired, method 400 can return to block 407, where attempted watermark detection continues.

Returning to the determination of block 409, if a watermark has been detected, another check can be made at block 413 to determine if information included in the detected watermark matches information associated with a valid, stored replacement content. If the information included in the detected watermark does not match the information associated with a stored replacement media item, the method 400 can branch to block 411, where a determination is made regarding whether a detection timer has expired.

However, if it is determined at block 413 that the information included in the detected watermark matches the information associated with a stored replacement media item, the stored replacement media item can be said to be associated with the detected watermark. In at least one embodiment, the watermark detector is turned off, as illustrated by block 419, the replacement media item or items associated with the watermark can be played out, as illustrated by block 421, and a playout notification can be sent, as shown at block 423.

In some embodiments, the watermark detector may not be turned off at block 419 in response to detecting a single watermark. Instead, although not explicitly illustrated in FIG. 4, the watermark detector may remain on for a predetermined period of time, and multiple watermarks can be detected during a single watermark detection window. In some such embodiments, each of multiple watermarks can be associated with particular replacement content. So, for example, if two watermarks are received during a single watermark detection window, each watermark can trigger substitution of a particular advertisement in an upcoming spot block.

The notification sent at block 423 can include, for example, information identifying a successfully played-out substitute media item, information identifying a watermark for which no valid, stored replacement item could be found, a time of playout, a source of the replacement content, a failure code indicating why an attempted replacement was unsuccessful, or other similar information.

Figure 5:
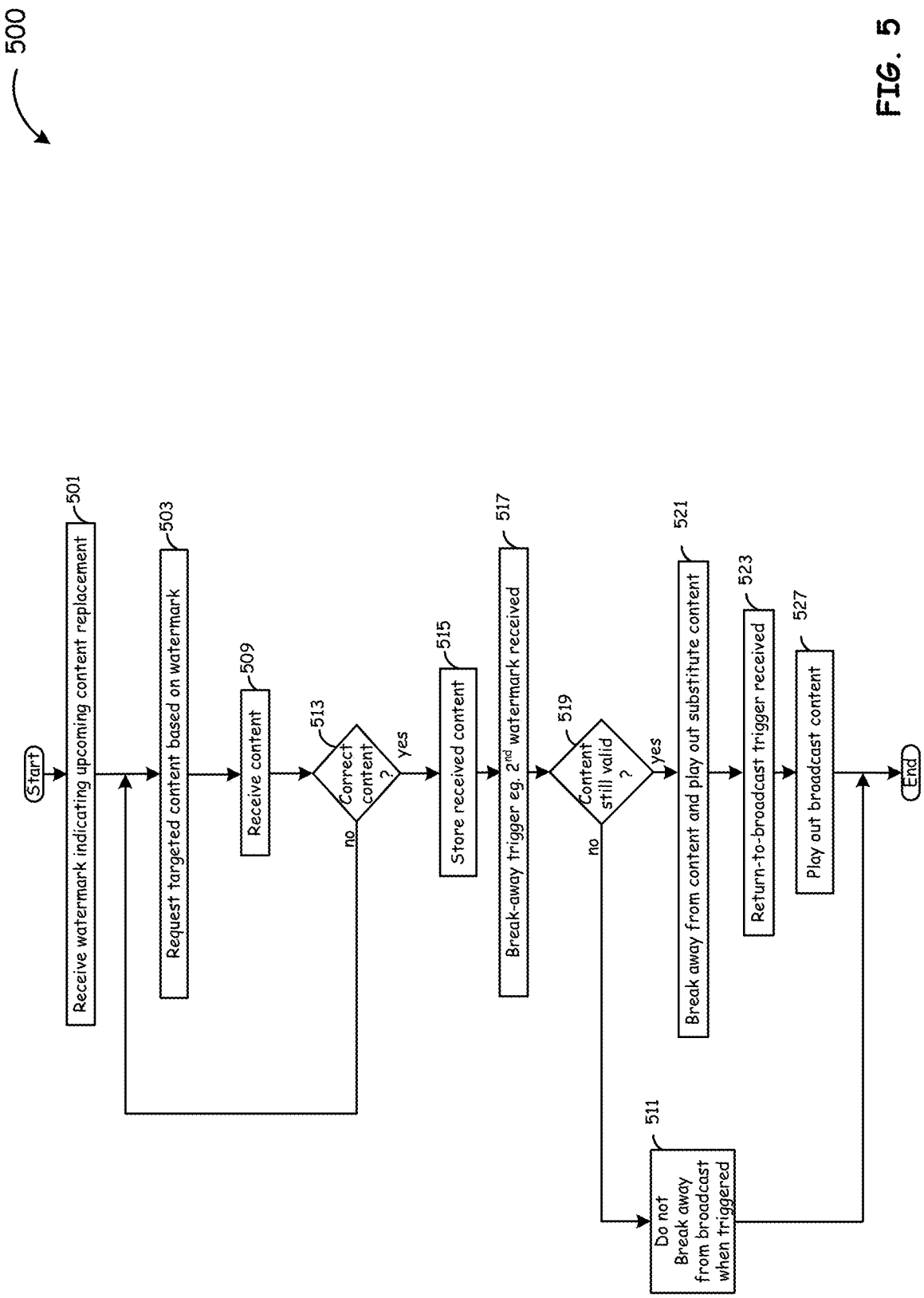
FIG. 5 is a flowchart illustrating a method of substituting stored media items for broadcast media items using actionable watermarks, in accordance with various embodiments of the present disclosure.

Referring next to FIG. 5 a flowchart illustrating a method 500 of substituting stored media items for broadcast media items using actionable watermarks will be discussed in accordance with various embodiments of the present disclosure.

As illustrated by block 501, an embedded watermark is received in an over-the-air broadcast, where the embedded watermark indicates an upcoming content replacement. In some embodiments, the embedded watermark can be received at any time after a first spot break, but before a second spot break, preferably with sufficient time remaining before the upcoming spot break for appropriate replacement content to be received at the radio via an out-of-band transmission. The watermark can include information sufficient to allow the mobile radio receiving the over-the-air broadcast to request the appropriate replacement content, for example demographic information associated with a user of the radio, advertiser information, category and type information, location information, time of year information, current event information, preferences obtained from an account associated with the user, or the like.

As illustrated by block 503, a request for targeted replacement content can be transmitted by the radio to an advertisement or web service via an out-of-band communication channel. The targeted content can include but is not limited to, advertisements or other media selected according to stored preferences, or preferences inferred based on an observed history of user actions such as tagging, tuning away, or the like. In at least one embodiment, the request for targeted replacement content can include information extracted from an actionable watermark, information obtained from user preferences, demographic information, and/or locally stored history information.

As illustrated by block 509, content is received in response to the request. A check is made at block 513 to determine if the received information includes the correct content. The check performed at block 513 can be based on a comparison of received content attributes to information extracted from the embedded watermark. If the correct content is not received, another request for targeted replacement content can be sent as shown by block 503. If the correct content has been received, as determined at block 513, the content can be stored, as illustrated by block 515, in a local memory, such as a memory on-board or attached to the radio, a memory accessible to the radio via a local network, a memory accessible via a Bluetooth® paired device, or the like.

As shown by block 517, a break-away trigger can be received. A break away trigger can include, but is not limited to a second or subsequent embedded watermark or command from a local playout control module generated in response to the start of a spot block, completing playout of a particular media item, or the expiration of a timer.

In response to receiving a break-away trigger, a check for content validity can be made, as illustrated at block 519. The check to determine whether stored content remains valid can include, but is not limited to checking a time-to-live flag associated with the replacement media item, calculating a checksum to verify that the media item is corrected, performing a comparison of stored media item attributes to information extracted from an embedded watermark to re-verify that the content item is of an appropriate type, duration, category, or the like.

If the content is determined not to be valid at block 519, method 500 can proceed to block 511, where the broadcast content is played out without substitution, despite the break-away trigger. If, however, it is determined at block 519 that the replacement content is valid, method 500 can break away from playing out over-the-air broadcast content and instead play out stored replacement media item or items that are associated with the received watermark, as illustrated at block 521.

As illustrated at block 523, a return-to-broadcast trigger can be received, and in response play out of broadcast content is resumed at block 527. A return-to-broadcast trigger can include, but is not limited to, a rejoin signal embedded in the over-the-air broadcast or received via an out-of-band transmission, the expiration of a timer, or completing playout of a media item.

Referring next to FIG. 6 a flowchart illustrating a method 600 of broadcasting actionable watermarks will be discussed in accordance with various embodiments of the present disclosure. In some embodiments, various portions of method 600 can be performed by media automation software during the scheduling process, for example scheduling transmission of attention markers by various systems, and insertion of watermarks. The out-of-band transmission of attention markers and insertion of watermarks into media items or into a broadcast signal generally, can be performed by a media automation system, a content provider, by a web service, by the broadcaster at the time of transmission, or by another entity.

As illustrated by block 601, a media automation system or broadcaster can broadcast over-the-air content on a particular radio frequency channel. As illustrated by block 603 a check can be made to determine whether a broadcast watermark is scheduled to be broadcast. In some embodiments, a broadcast log can include an item indicating that a watermark is to be embedded and broadcast during a particular timeslot, or in a particular media item. If no watermark broadcast is scheduled, over-the-air broadcast content can continue to be broadcast as normal, as shown by block 601.

If a determination is made at block 603 that a watermark is scheduled to be broadcast, or example by reference to a broadcast log, out-of-band transmission of a watermark notification signal, sometimes referred to herein as an attention marker, can be triggered, as illustrated by block 604. In various embodiments, the attention marker can be transmitted by a web service based on a broadcast log or other information provided to the web service by a media automation system.

A check can be made, as shown by block 605, to determine whether the broadcaster is responsible for inserting the watermark into the broadcast or a broadcast media item during the broadcasting process, or whether a media item including the watermark should be requested. In at least one embodiment, the determination at block 605 can be made by an over-the-air server or broadcast system based on a broadcast log provided by a media automation system.

If the determination at block 605 indicates that the broadcaster is not responsible for inserting the watermark, the over-the-air server or broadcast system can send a request for a version of a scheduled media item that includes the watermark, as shown by block 607. If, however, the determination at block 605 indicates that the broadcaster is to insert the watermark, method 600 proceeds to block 609, where the broadcaster inserts the watermark into the broadcast. It should be noted that even if the broadcaster is to insert the watermark during the transmission phase of the over-the-air broadcast, the broadcaster may still be required to request the information to be encoded into the watermark.

As illustrated at block 611, the watermark is broadcast, either as part of a pre-watermarked media item, or as part of the broadcast signal. As illustrated at block 613, a check can be made to determine whether the watermark should be transmitted a second or subsequent time. If not, method 600 returns to block 601. If the watermark is to be broadcast again, method 600 can return to block 605. In some embodiments, watermarks can be broadcast multiple times, in some cases in multiple different media items, to help ensure receipt and detection of the watermark.

Referring now to FIG. 7, a high-level block diagram of a processing system is illustrated and discussed. Processing system 700 includes one or more central processing units, such as CPU A 705 and CPU B 707, which may be conventional microprocessors interconnected with various other units via at least one system bus 710. CPU A 705 and CPU B 707 may be separate cores of an individual, multi-core processor, or individual processors connected via a specialized bus 711. In some embodiments, CPU A 705 or CPU B 707 may be a specialized processor, such as a graphics processor, other co-processor, or the like.

Processing system 700 includes random access memory (RAM) 720; read-only memory (ROM) 715, wherein the ROM 715 could also be erasable programmable read-only memory (EPROM) or electrically erasable programmable read-only memory (EEPROM); input/output (I/O) adapter 725, for connecting peripheral devices such as disk units 730, optical drive 736, or tape drive 737 to system bus 710; a user interface adapter 740 for connecting keyboard 745, mouse 750, speaker 755, microphone 760, or other user interface devices to system bus 710; communications adapter 765 for connecting processing system 700 to an information network such as the Internet or any of various local area networks, wide area networks, telephone networks, or the like; and display adapter 770 for connecting system bus 710 to a display device such as monitor 775. Mouse 750 has a series of buttons 780, 785 and may be used to control a cursor shown on monitor 775.

It will be understood that processing system 700 may include other suitable data processing systems without departing from the scope of the present disclosure. For example, processing system 700 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method for use in a radio frequency (RF) receiver, the method comprising:
receiving, by the RF receiver, a media broadcast including media items and embedded watermarks;
operating a watermark detection module in a low-power state, wherein during the low-power state the watermark detection module does not attempt to detect the embedded watermarks;
receiving at a marker detection module, from a source outside the RF receiver, an external signal including an attention marker associated with watermark detection;
activating the watermark detection module from the low-power state to an active state by transmitting a marker-detected signal from the marker detection module to the watermark detection module in response to the marker detection module receiving the attention marker, wherein during the active state the watermark detection module attempts to detect the embedded watermarks;
continuing to attempt detection of the embedded watermarks in the media broadcast until receiving an indication that watermark detection is to be discontinued; and
placing the watermark detection module in the low-power state in response to receiving the indication that the watermark detection is to be discontinued.

2. The method of claim 1, further comprising:
detecting a first watermark during a time period when the watermark detection module is in the active state; and
in response to the first watermark, playing out a substitute media item in place of a particular media item included in the media broadcast.

3. The method of claim 2, further comprising:
receiving a second watermark during the time period when the watermark detection module is in the active state, wherein receiving the second watermark is the indication that watermark detection is to be discontinued; and
placing the watermark detection module in the low-power state in response to receiving the second watermark.

4. The method of claim 2, further comprising:
wherein beginning to play out the substitute media item is the indication that watermark detection is to be discontinued; and
placing the watermark detection module in the low-power state in response to beginning to play out the substitute media item.

5. The method of claim 1, further comprising:
starting a detection timer, wherein expiration of the detection timer is the indication that watermark detection is to be discontinued; and
placing the watermark detection module in the low-power state in response to expiration of the detection timer.

6. The method of claim 1, further comprising:
detecting a tune-away event indicating that a user of the RF receiver is tuning-away from the media broadcast, wherein the tune-away event is the indication that watermark detection is to be discontinued; and
placing the watermark detection module in the low-power state in response to the tune-away event.

7. The method of claim 1, further comprising:
detecting an out-of-band rejoin signal, wherein the out-of-band rejoin signal is the indication that watermark detection is to be discontinued; and
placing the watermark detection module in the low-power state in response to the out-of-band rejoin signal.

8. A radio receiver comprising:
a tuner configured to receive a media broadcast including media items, an attention marker associated with watermark detection, and embedded watermarks;
playout circuitry coupled to the tuner, wherein the playout circuitry is configured to play out at least some of the media items included in the media broadcast;
a marker detection module configured to receive, from a source outside the radio receiver, an external signal including an attention marker associated with watermark detection, and is further configured to transmit a marker detected signal to a watermark detector in response to receiving the attention marker; and
the watermark detector coupled to the tuner and the marker detection module, the watermark detector including a processor and associated memory, wherein the watermark detector is configured to:
operate in a low-power state, wherein during the low-power state the watermark detector does not attempt to detect the embedded watermarks;
transition from the low-power state to an active state in response to receiving the marker detected signal from the marker detection module, wherein during the active state the watermark detector attempts to detect the embedded watermarks;
continue to attempt detection of the embedded watermarks in the media broadcast until receiving an indication that watermark detection is to be discontinued; and
transition back to the low-power state in response to receiving the indication that the watermark detection is to be discontinued.

9. The radio receiver of claim 8, wherein:
the watermark detector is further configured to detect a first watermark during a time period when the watermark detector is in the active state; and
in response to the first watermark, the playout circuitry is further configured to playout a substitute media item in place of a particular media item included in the media broadcast.

10. The radio receiver of claim 9, wherein the watermark detector is further configured to:
receive a second watermark during the time period when the watermark detector is in the active state, wherein receiving the second watermark is the indication that watermark detection is to be discontinued; and
transition back to the low-power state in response to receiving the second watermark.

11. The radio receiver of claim 9, wherein:
beginning to play out the substitute media item is the indication that watermark detection is to be discontinued; and
wherein the watermark detector is further configured to transition back to the low-power state in response to the playout circuitry beginning to play out the substitute media item.

12. The radio receiver of claim 8, further comprising:
a detection timer, wherein expiration of the detection timer is the indication that watermark detection is to be discontinued; and
wherein the watermark detector is further configured to transition back to the low-power state in response to expiration of the detection timer.

13. The radio receiver of claim 8, wherein:
the tuner is further configured to detect a tune-away event indicating that a user of the radio receiver is tuning-away from the media broadcast, wherein the tune-away event is the indication that watermark detection is to be discontinued; and
wherein the watermark detector is further configured to transition back to the low-power state in response to the tune-away event.

14. The radio receiver of claim 8, further comprising:
circuitry configured to detect an out-of-band rejoin signal, wherein the out-of-band rejoin signal is the indication that watermark detection is to be discontinued; and
wherein the watermark detector is further configured to transition back to the low-power state in response to the out-of-band rejoin signal.

15. A radio receiver comprising:
a tuner configured to receive an over-the-air media broadcast including media items and embedded watermarks;
a packet-switched network interface configured to receive replacement media items and an out-of-band attention marker associated with watermark detection;
playout circuitry coupled to the tuner, wherein the playout circuitry is configured to play out at least some of the media items included in the over-the-air media broadcast;
a marker detection module configured to receive, via the packet switched network interface, an external signal including an attention marker associated with watermark detection and transmit a marker detected signal to a watermark detector in response to receiving the attention marker; and the watermark detector coupled to the tuner and the marker detection module, the watermark detector including a processor and associated memory, wherein the watermark detector is configured to:

operate in a low-power state, wherein during the low-power state the watermark detector does not attempt to detect the embedded watermarks;

transition from the low-power state to an active state in response to receiving the marker detected signal from the marker detection module, wherein during the active state the watermark detector attempts to detect the embedded watermarks;

continue to attempt detection of the embedded watermarks in the over-the-air media broadcast until receiving an indication that watermark detection is to be discontinued; and transition back to the low-power state in response to receiving the indication that the watermark detection is to be discontinued.

16. The radio receiver of claim 15, wherein:

the watermark detector is further configured to detect a first watermark during a time period when the watermark detector is in the active state; and in response to the first watermark, the playout circuitry is further configured to playout a substitute media item in place of a particular media item included in the over-the-air media broadcast.

17. The radio receiver of claim 16, wherein the watermark detector is further configured to:

receive a second watermark during the time period when the watermark detector is in the active state, wherein receiving the second watermark is the indication that watermark detection is to be discontinued; and transition back to the low-power state in response to receiving the second watermark.

18. The radio receiver of claim 16, wherein:

beginning to play out the substitute media item is the indication that watermark detection is to be discontinued; and wherein the watermark detector is further configured to transition back to the low-power state in response to the playout circuitry beginning to play out the substitute media item.

19. The radio receiver of claim 15, wherein:

the tuner is further configured to detect a tune-away event indicating that a user of the radio receiver is tuning-away from the over-the-air media broadcast, wherein the tune-away event is the indication that watermark detection is to be discontinued; and wherein the watermark detector is further configured to transition back to the low-power state in response to the tune-away event.

20. The radio receiver of claim 15, further comprising:

circuitry configured to detect an out-of-band rejoin signal received via the packet-switched network interface, wherein the out-of-band rejoin signal is the indication that watermark detection is to be discontinued; and wherein the watermark detector is further configured to transition back to the low-power state in response to the out-of-band rejoin signal.

* * * * *